United States Patent
Hajiyev et al.

(10) Patent No.: US 10,423,512 B2
(45) Date of Patent: Sep. 24, 2019

(54) METHOD OF COLLECTING AND PROCESSING COMPUTER USER DATA DURING INTERACTION WITH WEB-BASED CONTENT

(71) Applicant: REALEYES OÜ, Tallinn Harju (EE)

(72) Inventors: Elnar Hajiyev, London (GB); Martin Salo, London (GB)

(73) Assignee: REALEYES OÜ, Tallinn Harju (EE)

( * ) Notice: Subject to any disclaimer, the term of this patent is extended or adjusted under 35 U.S.C. 154(b) by 177 days.

(21) Appl. No.: 15/322,888

(22) PCT Filed: Jun. 30, 2015

(86) PCT No.: PCT/EP2015/064900
§ 371 (c)(1),
(2) Date: Dec. 29, 2016

(87) PCT Pub. No.: WO2016/001257
PCT Pub. Date: Jan. 7, 2016

(65) Prior Publication Data
US 2017/0139802 A1   May 18, 2017

(30) Foreign Application Priority Data
Jul. 3, 2014  (GB) .................................. 1411912.7

(51) Int. Cl.
*G06F 3/00* (2006.01)
*G06F 11/34* (2006.01)
(Continued)

(52) U.S. Cl.
CPC .......... *G06F 11/3438* (2013.01); *G06F 3/011* (2013.01); *G06F 11/302* (2013.01);
(Continued)

(58) Field of Classification Search
CPC combination set(s) only.
See application file for complete search history.

(56) References Cited

U.S. PATENT DOCUMENTS 8,266,281 B1   9/2012   Carlson et al.
2011/0029666 A1   2/2011   Lopatecki et al.
(Continued)

FOREIGN PATENT DOCUMENTS

JP   2006-012171 A   1/2006
JP   2014-511620 A   5/2014

OTHER PUBLICATIONS

Japanese Office Action in corresponding JP Application No. 2016-519980, dated Feb. 5, 2019.

*Primary Examiner* — Di Xiao
(74) *Attorney, Agent, or Firm* — Leason Ellis LLP

(57) ABSTRACT

Embodiments of the invention provide a computer-implemented method of collecting computer user behavioral data during an interaction between a computer user and web-based content accessible via a computing device. A behavioral data collection activation script is provided, which may be provided within executable code of a webpage or media player executable on a webpage. The script runs during loading of the webpage or media player or upon execution of a specific operation or action within the webpage or media player. The script triggers activation of a data recording component on the computing device via a browser-based application programming interface (API), and triggers initiation of a behavioral data collection application on the computing device, which receives information from the data recording component as an input.

20 Claims, 6 Drawing Sheets

(51) Int. Cl.
*G06F 16/438* (2019.01)
*G06F 3/01* (2006.01)
*G06F 11/30* (2006.01)
*G06F 17/22* (2006.01)
*H04L 29/06* (2006.01)

(52) U.S. Cl.
CPC ...... *G06F 11/3089* (2013.01); *G06F 11/3476* (2013.01); *G06F 16/4387* (2019.01); *G06F 17/2247* (2013.01); *H04L 63/10* (2013.01); *G06F 2201/86* (2013.01); *G06F 2201/875* (2013.01)

(56) References Cited

U.S. PATENT DOCUMENTS

| | | | |
|---|---|---|---|
| 2012/0222057 A1 | 8/2012 | Sadowsky et al. | |
| 2013/0132833 A1* | 5/2013 | White | G06F 3/048 715/704 |
| 2014/0109085 A1* | 4/2014 | Carrara | G06F 8/61 717/178 |
| 2014/0115682 A1* | 4/2014 | He | G06F 21/316 726/7 |
| 2015/0106528 A1* | 4/2015 | Somes | H04L 67/141 709/228 |
| 2015/0119149 A1* | 4/2015 | Spitzer | A63F 13/77 463/43 |
| 2015/0193529 A1* | 7/2015 | Jo | G06Q 30/02 707/722 |

* cited by examiner

METHOD OF COLLECTING AND PROCESSING COMPUTER USER DATA DURING INTERACTION WITH WEB-BASED CONTENT

CROSS-REFERENCE TO RELATED APPLICATIONS

This application is a U.S. National Stage Application under 35 U.S.C. § 371 of International Patent Application No. PCT/EP2015/064900, filed Jun. 30, 2015 which claims priority to GB Application No. 1411912.7, filed Jul. 3, 2014, which are hereby incorporated by reference in their respective entireties.

FIELD OF THE INVENTION

The invention relates to the collection and processing of computer user behavioural data of a computer user during interaction with web-based content, e.g., while watching a video or engaging in an activity. In particular, the invention relates to systems, methods and computer program products for the collection and processing of emotional state information about the user. The collection and processing of such information allows systems utilized by advertisement and content producers, distributors, network operators and similar entities to be responsive to such information, e.g., in optimizing the transmission of content on the basis thereof, evaluating performance, targeting advertisements, etc.

BACKGROUND TO THE INVENTION

From a commercial viewpoint, it is important to be able to evaluate the performance of content provided online, e.g., an advertisement ("ad"), game, music video, television show, etc. Known systems allow for computer users to manually rate content, e.g., by selecting a suitable rating value, as well as receive questionnaires or interviews as part of an effectiveness tracking scheme.

Techniques for measuring a computer user's emotions, e.g., by facial features tracking or the like, have been incorporated into methods of evaluating the performance of video content. For example, an imaging unit, such as a webcam, can be used to capture the facial features of a computer user as he or she watches video content. The captured images can be processed to yield information about the computer user's emotions at certain points in the video, which is valuable feedback as to the performance of the video.

The video and the captured images can be transmitted over the Internet, whereby the feedback can be automatically gathered from a plurality of remote computer users. For example, US 2012/0222057 discusses a system in which a video is embedded in a web-enabled interface, which is arranged to collect mental state data for a computer user who watches the embedded video. The web enabled interface itself can be distributed, e.g., by sending an appropriate URL to a plurality of prospective viewers.

SUMMARY OF THE INVENTION

Embodiments of the present invention propose making a behavioural data collection activation script available to a webpage or media player that is executable on a webpage, whereby visitors to the webpage are capable of executing the behavioural data collection activation script to participate in behavioural data collection.

According to one embodiment of the invention, there is provided a computer-implemented method of collecting computer user behavioural data during an interaction between a computer user and a computing device. The method according to this embodiment comprises running a data collection activation script that is available to a webpage or a media player, which may be contained in the source code of a webpage or media player. Running the data collection activation script comprises locating a trackable element associated with the webpage or media player; upon locating a trackable element, calling a browser-based application programme interface to trigger activation of a data recording component on the computing device, and triggering initiation of a behavioural data collection application on the computing device.

Continuing with the present embodiment, a call is made to the browser-based application programme interface to access the data recording component in order to collect behavioural data recorded by the data recording component during the interaction between the computer user and the computing device. The call to the browser-based application programme interface may be made by program code that is deployed as part of the behavioural data collection application. Where the trackable element is not present or is unable to be located, the webpage, video or other content item under observation loads on the computing device without the collection of behavioural data, e.g., the webpage is presented and the data recording component remains in a state in which it does not collect behavioural data.

As those of skill in the art recognize, the method links the launch of the behavioural data collection application or process with access to or operation of the webpage or media player, or with one or more elements on or associated with the webpage or media player. As those of skill in the art further recognize, and as in described in detail herein, the activation script, application program interfaces, trackable elements and behavioural data collection application are implemented as program code executing on a processor that is part of a computing device, which also comprises a memory and a data storage component in communication with the processor and memory.

In one embodiment, the behavioural data collection activation script (also referred to herein as a "data collection activation script", an "activation script" or simply a "script") runs during loading of the webpage on a browser on the computing device, or can be linked with a specific operation or action within the webpage. Alternatively or additionally, the activation script can run during execution of the media player, or can be linked with a specific operation or action within the media player. Indeed, the trackable element can be a media player itself, e.g., when embedded in a webpage. For example, running the data collection activation script can occur in response to (e.g., can be triggered by the detection of) any one or more events, including, but not limited to: loading the media player; detecting playback of predetermined media content (e.g., a video ad) on the media player; receiving a user input on the media player (e.g., selection of a "play" button or a "pause" button); beginning playback of an item in a playlist on the media player, etc.

The data collection activation script can call a browser-based application programme interface ("API"), such as WebRTC, to access and activate a data recording component in communication with a computing device operated by the user. Control of the data recording component can thus remain within the browser and under the programmatic direction of the activation script and/or behavioural data collection application.

Running the data collection activation script can comprise locating a trackable element. In one embodiment, the data recording component is activated when the activation script locates a trackable element. In this manner embodiments of the invention can prevent unnecessary allocation of processing capability to the data recording component in situations where the web-based content that is accessed by the user is not suitable for collecting behavioural data, thereby maximizing the utilization of finite network and local computing resources.

Running the data collection activation script can include initiating an event log for recording events at the trackable element. The event log can comprise one or more digital files for storage locally on the user computing device or on remote locations accessible over a computer network. Herein, a trackable element can mean any portion of a webpage or media player with which the user can interact in a manner that leaves a recordable trace including, but not limited to, commands, cursor motion, clickstream data, etc. For example, the trackable element can comprise a media player, and the event log can record information about the content played back on the media player together with information relating to the user's interaction with the media player. Other examples of a trackable element include, but are not limited to, an interactive media component, a web form, etc.

The event log may operate under the control of an event log application or similar program code, which can populate the event log with data obtained by subscribing to an application programme interface (API) associated with the trackable element. According to one embodiment, the event log records information for one or more trackable elements on a given webpage. The event log can thus provide a rich source of user interaction information for use by other computing processes, such as an advertisement targeting application or activity tracking software. Furthermore, the event log can be synchronised with behavioural data collected by the data recording component, e.g., by time stamping or the like. This enables the event log to provide an additional analysis dimension for the collected behavioural data.

Herein, the term "behavioural data" is used generically to mean any kind of information that can be used to classify or identify a user. Behavioural data can encompass any one or more of emotional response information, physiological data, and other user-related data.

Emotional state information can be obtained by analysing collected data (e.g., webcam images and audio) to derive information indicative of a user's current emotions, e.g., angry, disgusted, neutral, sad, scared, happy, surprised and their derivatives. Emotional state information can also be derived to indicate temporary emotional states, such as boredom, engagement, positive and negative valence, or even long-lasting emotional states, such as general depression, bad mood, good mood, etc. The emotional state information can undergo further analysis to obtain a correlation coefficient between different emotion states. Such correlation coefficients provide further data points for collection and processing, which may lead to further refinement of action or response taking by application programs or processes that receive such processed information as input.

The emotional state information can be combined with other user-related data (see below) to derive further indicators of a computer user's reaction, e.g., engagement, etc. Herein, emotional state information can include the emotions detected from facial expressions as mentioned above. Alternatively or additionally, emotional state information can be derived from information collected regarding body gestures, e.g., movements of the head, hands, or whole body. For example, nodding can indicate agreement, or frequent head movements can indicate lack of concentration. The emotional state information can further include gaze tracking to monitor where a user's attention is focussed.

As used herein, the term "physiological data" can comprise information collected via a suitable sensor from a user interacting with media content. Physiological data can include, but need not be limited to, information indicative of physiological parameters such as heart rate, blood pressure (e.g., based on skin colour), blinking, breathing rate, etc.

As used herein, the term "other user-related data" can comprise demographics data, such as age, gender, ethnicity, etc. The demographics data can be deduced from a webcam video stream of the user. This data can be valuable for segmentation of aggregated results recorded for a plurality of users. The other user-related data can also comprise information about other user actions on the computing device, e.g., browsing history, clickstream data, etc. For example, the other user-related data can comprise mouse or cursor movement patterns.

The data collection activation script can also be used as a preliminary filter or data capture capability check to ensure that the computing device has the necessary available components to record behavioural data, as well as to ensure that the captured data is going to be of sufficient quality to be useful as input to subsequent application programs. Thus, running the data collection activation script can include performing a preliminary data capture capability check to ascertain that the computing device is capable of performing behavioural data collection. In this manner, embodiments of the invention can prevent unnecessary allocation of processing capability to collecting behavioural data in situations where the computing device is not suitable for collecting behavioural data, which again reduces pressure placed on finite computing and network infrastructure.

The data recording component can be a webcam and/or microphone, wherein the behavioural data can be derived from various combinations of a video feed from the webcam and audio feed from the microphone. More generally, the data recording component can comprise any hardware sensor capable of measuring a physiological parameter of a user, e.g., Bluetooth®-enabled arm-bands or other wearable devices for measuring heart-rate, body temperature, skin moisture level, etc. Such devices can provide information that is useable in interpreting a user's emotional state, e.g., provide specific physiological data points that embodiments of the invention collect for processing.

The preliminary data capture capability check can thus perform one or more checks, which the activation script can perform prior to the attempting to collect user behavioural data. According to various embodiments of the present invention, checks can include, but are not limited to a hardware/software capability check; a user requirements check (e.g., to prevent repeated recording if an emotional response has already been obtained for a given user, or to ensure the user possesses desired demographic characteristics); and a media requirements check (e.g., to check if behavioural data recording for the piece of media content to be displayed has been disabled or is not required).

The data collection activation script can also be used to obtain permission of the computer user to access relevant hardware and software components, as well as send the data for analysis. Running the data collection activation script can therefore comprise detecting a user permission trigger event, and upon detection of the user permission trigger event, triggering display of a user permission dialog on the computing device. The data collection activation script can also check if permission has previously been given, e.g., by looking for the status of a dedicated flag or for the presence of a relevant cookie, either of which may be set and maintained either locally or remotely.

The user permission trigger event can be linked to the provision of one or more user incentives, e.g., as a technique for encouraging users to give permission for the collection of their behavioural data. The identity of an available user incentive can be displayed to the user together with or in advance of the user permission dialog. Examples of user incentives include, but are not limited to, any one or more of: access to premium content, such as content reserved for users who have given permission; gift coupons, e.g., providing discounts for products or services of interest to the user; additional points for a user seniority score, e.g., on a forum or other social scoring system; and access to the emotion response data recorded for the user and/or for a wider audience, i.e. access to aggregated information recorded for a plurality of users.

Initiation of the behavioural data collection application can comprise establishing communication between the computing device and a remote server, and sending the collected behavioural data to the remote server for analysis. The analysis results can be returned from the remote server to the computing device, where they can be displayed or otherwise used to trigger further action, e.g., to provide a signal to program code executing on the computing device (or anther device) to affect or change the operation of the webpage and/or trackable web element. The behavioural data collection application can be arranged to part-process (or even fully process) the collected behavioural data prior to transmission to the remote server for analysis.

Analysis of the collected behavioural data can be used to generate an emotional state evolution data log for the computer user. Embodiments of the invention contemplate synchronising the event log with the behavioural data collected at the data recording component by overlaying or cross-referencing behavioural data with data contained in the event log. Generation of an emotional state evolution data log allows other software and hardware processes, as well as systems run by advertisers, program distributors and network operators, etc., to investigate how events in the event log affect the user's emotional state. And as described in greater detail below, the aggregation of such synchronised data from a plurality of users enables the detection of patterns of generic behaviour.

Techniques for the detection of patterns of generic behaviour may be expressed as a computer-implemented method of analysing computer user behaviour. According to one embodiment, such a method comprises receiving, at an analysis server from each of a plurality of remote computing devices, an event log and a collected behavioural data stream (e.g. emotional state evolution data log), wherein each event log comprises a history of events occurring at a trackable element on the respective computing device, and each collected behavioural data stream comprises data representative of a history of the computer user's behaviour corresponding to the history of events. The method further comprises matching a plurality of event logs from different users based on one or more corresponding events therein; aggregating the collected behavioural data streams for the matched plurality of event logs; and displaying an output representative of the aggregated collected behavioural data.

The event logs can be matched in a variety of ways. For example, matching the plurality of event logs can comprise identifying playback of a common piece of media content in each of the event logs. A portion of each event log and its corresponding behavioural data can thus be extracted for use in the aggregating step. Alternatively, or in conjunction with the foregoing, event logs and corresponding behaviour data can be used as an ongoing stream of information, which can be used to analyse the effects of other external factors.

According to one embodiment, the method includes receiving, at the analysis server, a global event log representative of a history of global events that are experienced by a plurality of the computer users. Matching the plurality of event logs may comprise synchronising the event logs of the plurality of computer users who are exposed to the global events; aggregating the collected behavioural data streams for the synchronised plurality of event logs; and displaying an output representative of the aggregated collected behavioural data.

The use of a global event log allows for identification of the effect of global events. For example, a plurality of users can reside in a particular location and the global event log can represent the weather conditions in a particular location (e.g. town or city). The emotional response of those users can be aggregated (based on knowledge of their location), to analyse the affect of the weather conditions on the emotional response of users, e.g., in comparison with similar data obtained for a different location.

These and other aspects, features, and embodiments will be more fully appreciated from the accompanying detailed description of certain embodiments of the invention.

BRIEF DESCRIPTION OF THE DRAWINGS

Examples of the invention are discussed below in detail with reference to the accompanying drawings, in which.

DETAILED DESCRIPTION OF CERTAIN EMBODIMENTS OF THE INVENTION

Figure 1:
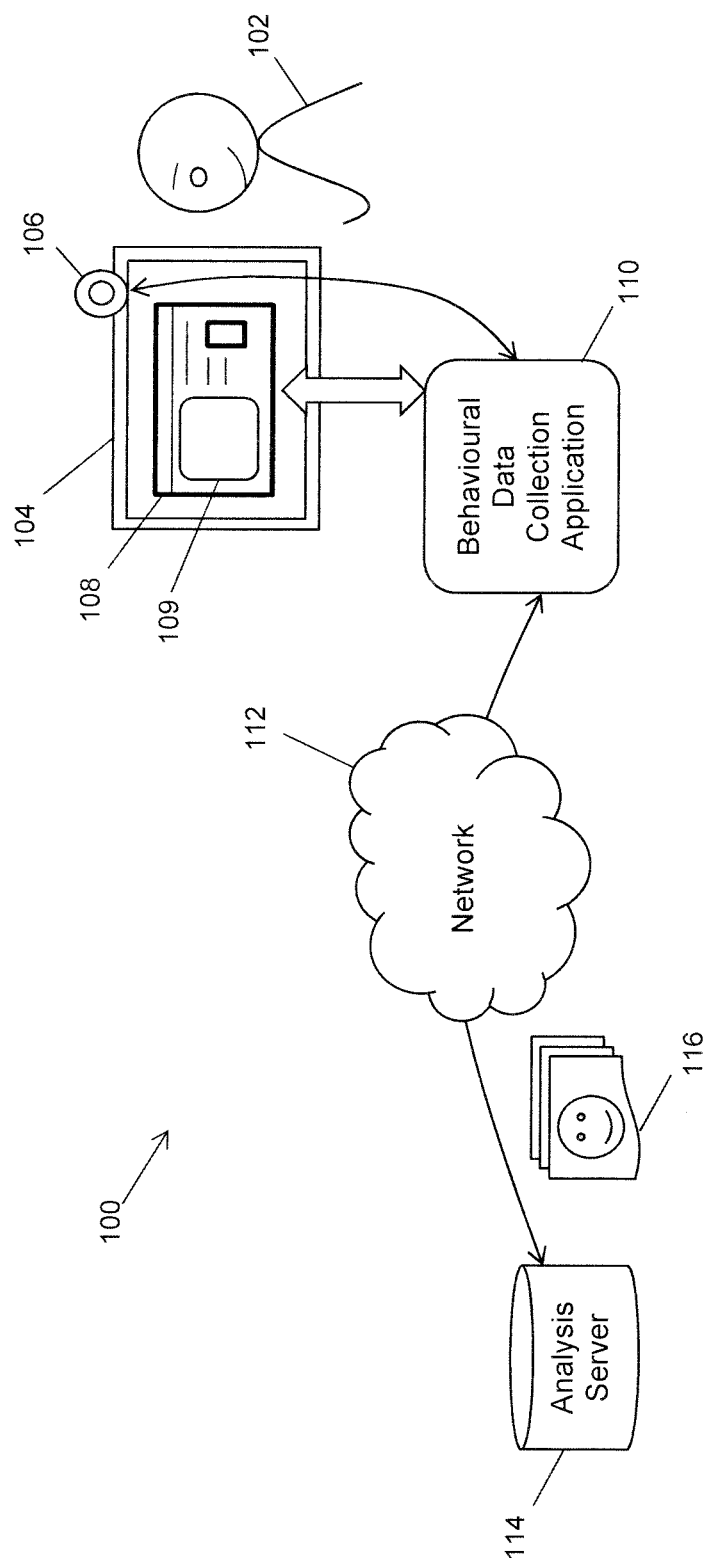
FIG. 1 is a schematic drawing of a system for implementing a method for the collection and processing of computer user behavioural data in accordance with one embodiment of the present invention.

FIG. 1 depicts an exemplary environment 100 within which embodiments of the present inventions can operate. A user 102 views web-based content on a display 104 associated with a network-enabled computing device, e.g., a PC, laptop computer, tablet computer, smart television, set top box, games console or smartphone. The computing device is thus capable of sending and receiving data over a network 112, such as the Internet.

The computing device or display 104 is connected to or has inbuilt modules or circuity for recording behavioural data, such as a microphone, a webcam 106, etc. As is conventional, the user 102 views web-based content (e.g., webpages) via a suitable web browser 108. The web browser 18 can comprise, e.g., have available to or embedded therein, a media player 109 suitable for playing media (e.g. video or audio) content. The media player can be a local application such as Windows Media Player, QuickTime Player, Audacious, Amarok, Banshee, MPlayer, Rhythmbox, SMPlayer, Totem, VLC, and xine, or an online video player, such as YouTube player, AOL player, JW Player, Flowplayer and Brightcove.

The computing device has a behavioural data collection application 110 associated with it, e.g., stored in memory thereon or downloadable or accessible via a network. The user 102 can receive on the computing device an invitation to participate in a behavioural data collection exercise, e.g., whilst viewing content on the web browser 108. However, the user does not require a specific invitation, e.g., via email or the like. By incorporating or making available a behavioural data collection activation script within the code of a webpage or media player executable on a webpage as explained below, visitors to the webpage can participate in behavioural data collection.

Upon execution, the behavioural data collection application 110 can communicate with a remote analysis server 114 to execute and control the behavioural data collection exercise. The application 110 may be implemented in various combinations of hardware and software, including logic implemented in one or more custom ASICs, programmed in a FPGA, etc.

As used herein, the terms "server" and "network-enabled computing device" (also "computing device" or "device") refer to a computer having at least one processor that executes instructions therein received from a memory structure (e.g., RAM) in order to implement functionality useful in connection with one or more embodiments of the invention. These devices further comprise network interface components comprising hardware and software configured to enable communications over a network between the server and one more computing devices at which computer user behavioural data is being captured. By way of example and not limitation, the communications can comprise data packets constructed in accordance with a user datagram protocol ("UDP") or an Internet Protocol ("IP").

These devices have hardware (or software from an accessible memory) that executes in respective processors to implement the functionality described herein. As such, more general statements described herein regarding the arrangement of an application, steps taken in connection with one or more methods, functions capabilities, and so on, unless expressly noted otherwise, are made in relation to servers and/or computing devices configured by code executing by a processor.

The behavioural data collection application 110 can be an emotion tracking application for collecting information indicative of the user's emotional state. The data collection application can also be arranged to collect other types of behavioural data. The collected behavioural data can allow the user's emotions to be tracked during the user's interaction with web-based content displayed via the web browser 108.

The manner in which the behavioural data collection application 110 is executed is described in more detail with reference to FIG. 2. Once executed, the behavioural data collection application 110 can control an initialisation process which sets up communication between the analysis server 114 and the modules or circuitry to record behavioural data (e.g. webcam 106) to enable collected data 116 (e.g. webcam images, behavioural data, media attributes, etc.) to be transferred therebetween.

According to various embodiments, software (which comprises program code or similar instructions for execution by the processor of the computing device) can be used to set up such communication. For example, the initialisation process can comprise setting up (e.g., obtaining authorisation for) communication across the network 112. The collected data 116 can thus be sent over the network to the analysis server 114, where information about the user's emotions can be extracted and used for further processing and analysis. According to certain embodiments of the present invention, however, some or all of the initialisation process can be executable by running the behavioural data collection activation script on the webpage, as is described in FIG. 2 below.

The user's emotions can be tracked using program code that configures the processor of the local computer to make determinations of the computer user's emotions, such as the six universal emotions described above. Alternatively, the user's emotions can be tracked using program code executing at the analysis server 114 that configures the processor of the that server to make determinations of the computer user's emotions, such as the six universal emotions described above, either using the raw captured image data, or using the signals processed by the behavioural data collection application 110 at the local computer prior to transmission to any remote server.

The processing of the collected behavioural data may include several sub-processing steps, at least one of which transforms the computer user behavioural data that has been collected into data packets suitable for transmission to a remote server, and more preferably to include temporal information related to the video playback and the moment or segment that was being played at the client computer during the collection of the computer user behavioural data.

The collected data can undergo additional processing, which can take place before transformation into packets or a file for transmission over a network, to coordinate the captured computer user behavioural data with moments or segments of the video provided to the computing device during media playback, including at least moments or segments during media playback of a video ad at the computing device. Such processing includes instructions executing by the processor of the computing device that synchronize images being captured with a temporal location within the media being played back at the user's computing device, such as by associating a time code or range of time codes of the video with the captured computer user behavioural data. The synchronization can be important to solve latency problems associated with the reception of streamed content at the computing device, associated with local processes (such as those which might change the timing of media playback relative to the transmission of streamed content to the computing device), and events at the computing device which also can affect the time window of media playback (e.g., as one non-limiting example, the user pauses or rewinds playback).

The additional processing in accordance with this aspect of the invention causes temporal information concerning the computer user behavioural data to be included among the data packets being transmitted to the analysis server 114, in addition to the transmission of the computer user behavioural data itself to the analysis server 114.

In further more particularized aspects, the time codes for the moments or segments during which computer user behavioural data is being captured can comprise time offsets relative to a video ad, and optionally relative to other video content being played back in the media playback application.

In still further aspects of the invention, the computing devices can be configured to more efficiently utilize their resources so as to minimize interruption of media during playback. In this regard, system components are monitored and their performance or values are utilized in determinations as to when certain local processing is to be performed. As such, processing of computer user behavioural data can be performed dynamically (starting and stopping) in view of the performance capabilities of the user's computing device on which the processing is being performed and in further view of connectivity between the computing device and the network to which it is connected.

In addition to the foregoing, the collected data 116 can be partly or fully processed at the computing device 104 where the processing power of the computing device 104 on which the media is being viewed is sufficient. A decision about whether or not to perform client-side processing in this way can be determined by execution of the behavioural data collection activation script, e.g. by way of a check for processing capability and/or availability of required APIs on the computing device 104.

At the analysis server 114 the received information from the user can be used to for various purposes, e.g., to generate information indicative of the relative quality of the web-based content viewed by the user. According to one embodiment, the analysis server 114 is arranged to receive collected data 116 from a plurality of users, which collected data 116 can be aggregated and then compared with itself or with stored data relating to other web-based content in order to determine and output the information indicative of the relative quality of the web-based content. The output information can be displayed locally and/or communicated remotely, e.g. to the user or to a third party (e.g. the owner of the media), as is determined by program code executing by the processor to implement such functionality.

Embodiments of the present invention describe a technique for triggering behavioural data collection through the act of loading a content item, e.g., via the activation of a script that runs when the webpage is loaded. In contrast to known behavioural data collection techniques, embodiments of the present invention are not tied to a specific user, group of users or to a specific piece of media (e.g., a specific video ad). By contrast, the methods contemplated by embodiments of the present invention permit the collection of a quasi-continuous stream of behavioural data from a user that corresponds to his or her ongoing online presence.

There are numerous advantages to such a streaming collection technique. For example, such a technique dramatically widens the pool of users over which collection and analysis is performed. In previous collection regimes, it was often only possible to collect data from a preselected group of users, e.g., a set of review panellists. By contrast, the present invention enables behaviour data collection from any user visiting a website from a device that is capable of capturing behavioural data (e.g., possessing a camera, microphone or the like). Providing a wider pool of users enables better demographic targeting capabilities by systems that utilize captured behavioural data, faster data collection, substantially larger data samples for better statistical significance of the collected data, and less biased data (e.g., the fact that users are paid to view is no longer an influence on the outcome).

In addition to the foregoing, data collection techniques in accordance with embodiments of the present invention open up further analysis dimensions for the user data. For example, having a quasi-continuous stream of behavioural data can enable the impact of external events (e.g., time of day, season, weather, economic factors (both generic and user-specific), user location, etc.) on a user's behavioural to be analysed. Moreover, where such quasi-continuous behavioural data is available for a plurality of users, more global analysis of external factors can be analysed, e.g., on user data that is aggregated in some manner, e.g., based on demographic information, user location, browsing history.

For example, the behavioural information of a plurality of users visiting a certain webpage or group of webpages (or a portion of a webpage) can be aggregated into time series data. In itself this information can provide ongoing feedback with regard to a generic user response to a webpage. However, a further analysis dimension can comprise comparing the aggregated data with a corresponding time series of external events to assess whether there is any correlation with the user's response to the webpage.

A behavioural data collection activation script suitable for use with the invention can be inserted into the source code of a suitable webpage, which may be performed by the webpage publisher. Those of skill in the art recognize that the activation script can also be provided with a web page, but not as part of the source code of the web page, e.g., by way of a plug-in or similar architecture that expands the functionality made available by specific web pages, by downloading from a remote location for local execution or through remote execution. The script can be obtained by the publisher from the data analysis operator, which may be obtained by registering at a management website. The registration process can lodge or otherwise register the relevant webpage with the analysis server and give the webpage publisher access to reports of computer user behavioural data collected for that webpage from the analysis server.

As well as being available to webpage designers and publishers for insertion into the source code of a webpage, the behavioural data collection activation script can be inserted into a software application, such as the execution routine of individual media players. Thus, the script is run upon execution of the media player rather than loading of the webpage and therefore can be inserted into the player by media player owner, as opposed to a specific webpage publisher. In all other respects, the script can function in the same manner.

Figure 2:
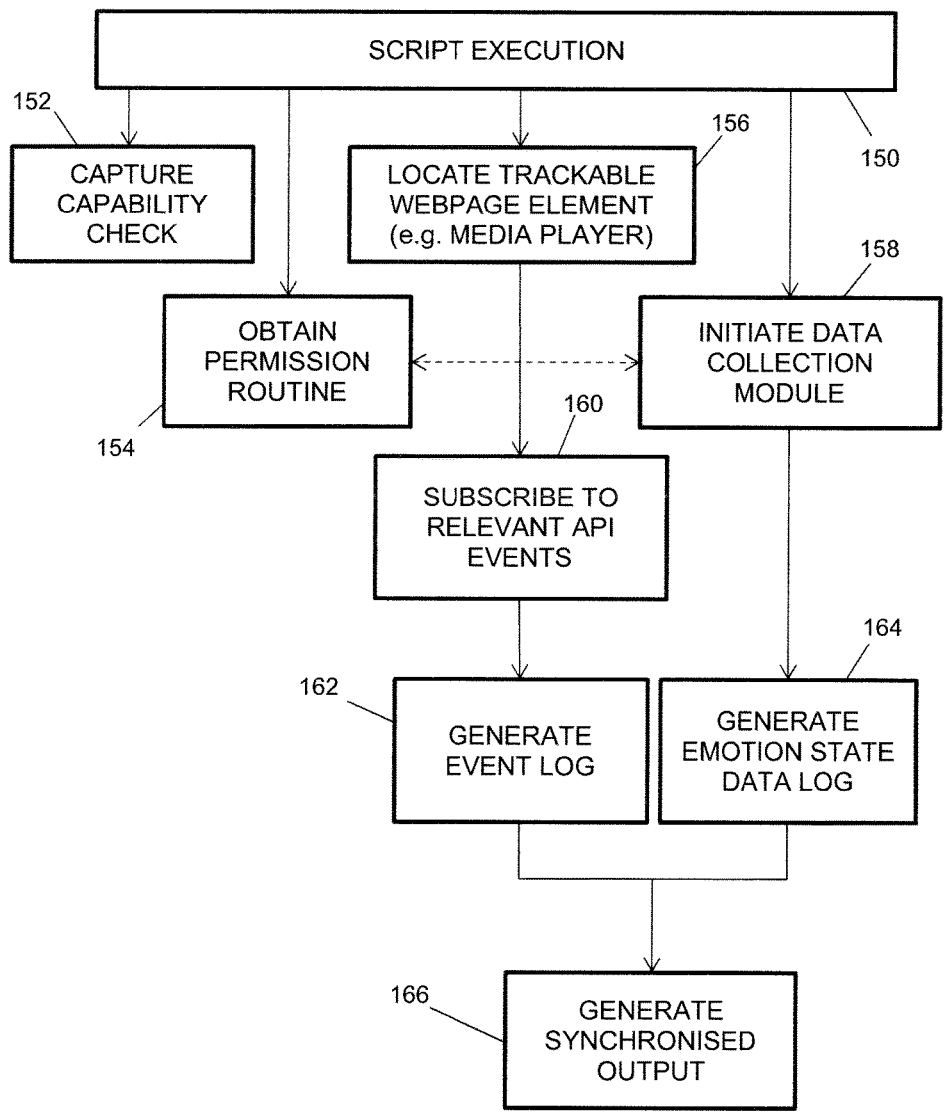
FIG. 2 is a schematic functional block diagram that illustrates the functions performed under the direction of a behavioural data collection activation script in accordance with one embodiment of the present invention.

FIG. 2 is a functional block diagram that illustrates the effect of running a behavioural data collection activation script according to one embodiment of the present invention. It can be seen from FIG. 2 that the script can be responsible for the execution of several functional routines or modules.

The act of executing the script can be tripped by a programmatic trigger, such as by loading the webpage or running a media player. Execution of the script 150 can trigger a capture capability check module 152 that performs a check to ascertain if the computing device on which the script is running is capable of collecting and transmitting behavioural (and specifically emotional state) data. For example, the capture capability check module 152 can check for the presence of a functioning camera (e.g., peripheral webcam or integrated smartphone camera). In certain embodiments, the module 152 can check the operating system and available processing power of the computing device to ensure they are compatible for behavioural data collection, as well as check the status of the network, e.g., to ensure support for streaming of the necessary volume of data.

Execution of the script can also trigger an obtain permission routine 154, which can cause the execution of program code to present a dialog box to the user asking for permission to access the camera and to transmit behavioural data to the analysis server. The routine can include a flag that can be set to indicate that the user does not want to be asked again for permission to collect data (e.g., is willing to grant ongoing permission for behavioural data collection).

The obtain permission routine 154 can be bypassed if this flag is set and detected, which may be detected at script execution 150. The obtain permission routine 154 can be triggered immediately upon running the script, or it can be triggered by detection of a specific event on the webpage, e.g., a certain click event (e.g., to activate a media player) or a play event within a media player.

The script can also be arranged to execute program code 156 by the processor that locates or detects trackable elements on the webpage. Herein, "trackable" refers to the element generating recordable events, either through its execution or through some interaction of the user. In the examples given herein, the trackable element can be a media player that can display media content to be consumed by a user. The recordable events in this case can represent the loading, playing, pausing, muting, etc. of media content in the media player. Such examples are not meant to be limiting and, indeed, trackable elements can also comprise cursor location information, clickstream data, etc.

Those of skill in the art further recognize that the whole webpage itself can be treated as a trackable element, e.g., based on the behaviour of dynamic events presented thereon. For example, the appearance, disappearance or movement of elements within the webpage, or other changes in the visible part of the webpage can be monitored. The whole browser window can also be a trackable element, where actions such as scrolling, visible browser area size (changes), tab switches, keystrokes, minimise/maximise window are monitored and logged.

Upon locating or detect trackable elements, the script can cause the processor to execute program code for a subscription module 160, which subscribes to events that occur within an API associated with the relevant trackable element. The script also causes the processor to execute program code in the form of a routine 162 that generates an event log to which events from the subscribed APIs are reported. The event log can thus represent a history of webpage-based activity. As described above, the obtain permission routine 154 can be triggered by a detected event from a trackable element.

The script can also initiate a data collection module 158 (e.g., corresponding to the behavioural data collection application mentioned above). Upon receiving approval from the obtain permission routine 154, the data collection module 158 can access the camera and/or other data recording devices (e.g. microphone) to begin capturing computer user behavioural data.

The data collection module 158 can function to generate an emotional state data log 164, which can comprise time series data indicative of the emotional state of the user. The emotional state information is extracted from the collected computer user behavioural data, which can occur partly or wholly on the computing device itself, can occur at the analysis server, or various combinations thereof.

The script can thus cause the parallel recording of an event history and user behavioural information history. These two data set can be combined in a synchronised output generation module 166, which can be on the computing device itself or in the analysis server. The synchronised output can be a display that overlays relevant events in the event history on corresponding emotional state information from the user, as determined by program code for the synchronized output execution on the processor. Alternatively or additionally, the synchronised output can be used to trigger further action at the user's computing device, in the analysis server, or other downstream systems that are operative to receive and act upon such output.

By obtaining synchronised output from a plurality of users, embodiments of the invention can be used to find correlations between certain events, such as webpage-based events, and the corresponding user behaviour (and emotion state).

Processes executed by program code deployed as part of the activation script, which are outlined above, can be used to implement one or more of the methods illustrated in conjunction with FIGS. 3 through 5, which are described below.

Figure 3:
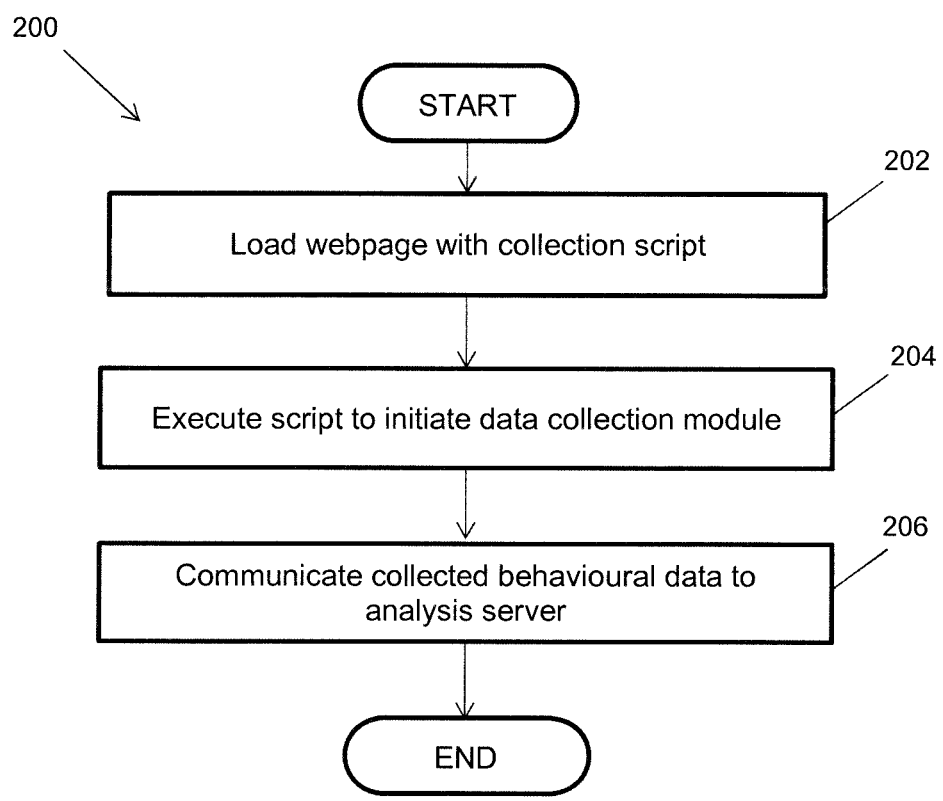
FIG. 3 is a flowchart depicting a method for the collection and processing of computer user behavioural data in accordance with one embodiment of the present invention.

FIG. 3 presents a flowchart that illustrates the basic steps of a method 200 in accordance with one embodiment of the present invention. The method 200 begins with a first step 202 of loading a webpage in a web browser on a user's networked-enabled computing device (e.g., PC, laptop, tablet, smartphone or the like). The webpage comprises a script in the form of program code, e.g. JavaScript® code or the like, which when executed by a processor of the network-enabled computing device triggers initiation of the behavioural data collection application 110 described above. The script is arranged to initialise reporting performance data for one or more web properties specified in the script.

In the exemplary embodiment of present invention, the method continues with a second step 204 of executing the script to initiate the behavioural data collection application. The behavioural data collection application can be stored either locally (such as on the user's computing device or a local network) or remotely (e.g., on the analysis server or a third party device). The script can reference (e.g. call) a file to execute the application. After the behavioural data collection application is executed, which can comprise the collection of behavioural data, the method continues with a third step 206 of communicating collected behavioural data to the analysis server.

In one embodiment, the behavioural data collection application can be arranged to receive data captured by one or more collections devices (e.g., camera, microphone) associated with the computing device. In this embodiment, the script can be arranged to initiate the one or more collection devices and to initialise the collection process by identifying both the user and, if desired, the regions on the webpage with which the user's interaction is to be recorded.

Figure 4:
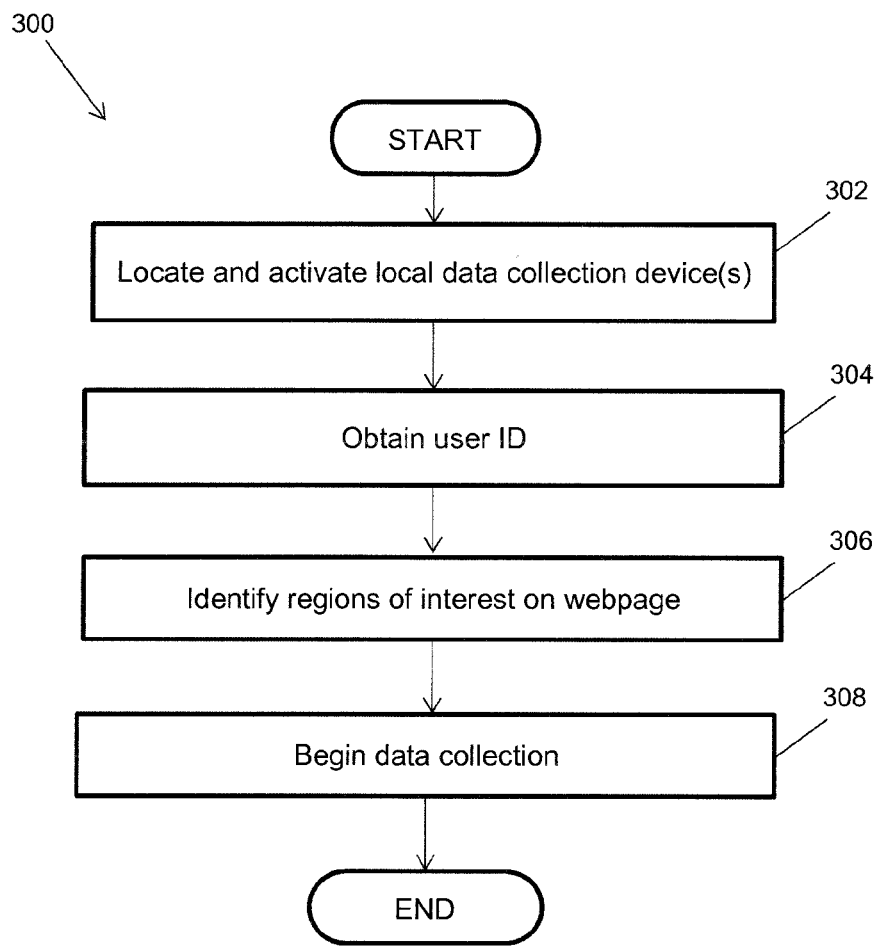
FIG. 4 is a flowchart depicting the steps involved in initiating a data collection module in accordance with one embodiment of the present invention.

Building on this point, FIG. 4 presents a flow chart that illustrates one embodiment of a method 300 that achieves these objectives. The method 300 begins with a first step 302 of locating and activating a local data collection device. This can be achieved using, for example, a WebRTC API or any other API offered by the browser or a third party library/application and that allows the web browser to access a camera or other peripheral recording device.

In a second step 304, the method obtains a user ID. This can be done actively, e.g., by displaying a user prompt, or passively, e.g., with reference to previously entered user credentials or information passed from a earlier event in the same or a previous browsing session. In one embodiment, the method can capture an image of the user's face and deploy a facial recognition technique to identify a user ID associated with the user in the image. The user ID is transmitted with the collected behavioural information to the analysis server. The user ID can be associated with a user profile, e.g., stored in or accessible by the analysis server, which can provide further information (e.g., demographic information, purchase history, etc.) about the user to facilitate comparative analysis.

The method 300 continues with a third step 306 of identify regions of interest on a webpage. If no regions of interest are identified then behavioural data collection can not be initiated.

After the regions of interest are identified, the method continues with a fourth step 308 of beginning data collection associated with the identified regions of interest. This step can include passing captured images or audio information from the data collection device(s) that were activated at step 302 and/or relevant clickstream data (which may comprise event information) to the behavioural data collection application. This data can be transmitted as is to the analysis server. Alternatively, the data can be partly or fully processed on the computing device before sending. For example, the behavioural data collection application can be arranged to extract emotional state information from the captured images. The extracted state information can be transmitted to the analysis server, as per instructions from program code controlling the transmission process.

Figure 5:
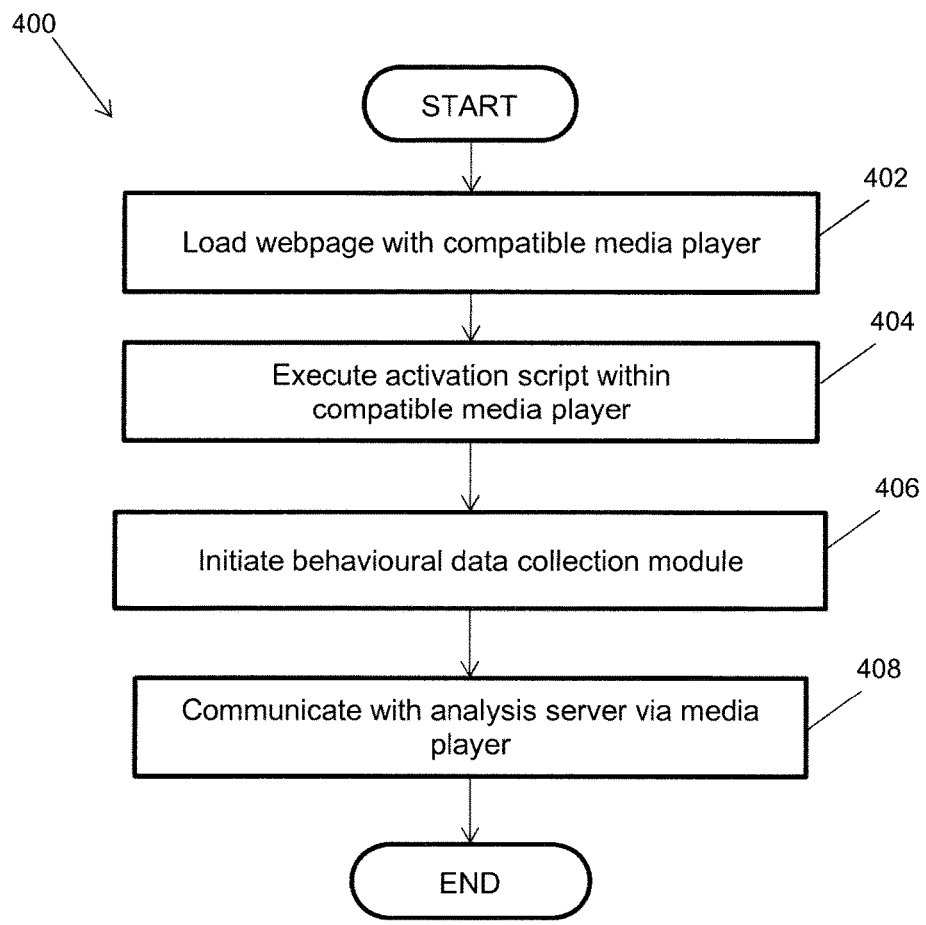
FIG. 5 is a flowchart depicting the steps involved in initiating a data collection module via a media player in accordance with another embodiment of the present invention.

FIG. 5 illustrates a method 400 of passing behavioural data to a remote analysis server in accordance with another embodiment of the present invention. In the embodiment of FIG. 5, program code comprising the behavioural data activation script is embedded in the operational code of the media player itself, or otherwise made available thereto, and the communication with the analysis server occurs through the media player. In other words, the behavioural data collection application is launched from within a media player framework, e.g., as an API associated with the media player.

The method 400 begins with a first step 402 of loading a webpage with a compatible media player thereon. Here, a "compatible" media player refers to a media player that is compatible with a behavioural data collection API which uses a protocol that permits collected data to be reported to a remote analysis server. Alternatively, program code in the webpage (or otherwise accessible to the client device) may cause instantiation and execution of a compatible media player.

The method 400 proceeds with a second step 404 of operating the media player to trigger execution of program code comprising the behavioural data activation script. Running the behavioural data activation script can be caused by the act of loading or executing the media player, it can be triggered by a specific action performed within the media player, a flag set on the client computing device, etc. As described above, the behavioural data activation script can locate trackable elements (which can be within the media player framework or, if security settings permit it, within the webpage that hosts the media player) in preparation for behavioural data collection.

Following execution of the behavioural data activation script, method 400 can proceed with a third step 406 of initiating a behavioural data collection module, which causes the execution of program code to obtain access to one or more data collection devices (e.g. webcam, microphone) and begin to collect behavioural data. The behavioural data collection application can run within the media player framework even when there is no media playback on the media player. Behavioural data can thus be collected for the user's interaction with the webpage regardless of whether or not that interaction includes consuming media content.

After the behavioural data collection application is initiated, the method 400 continues with a fourth step 408 of communicating the collected data to the analysis server. As described above, the data can be partly or fully processed on the computing device before sending.

Figure 6:
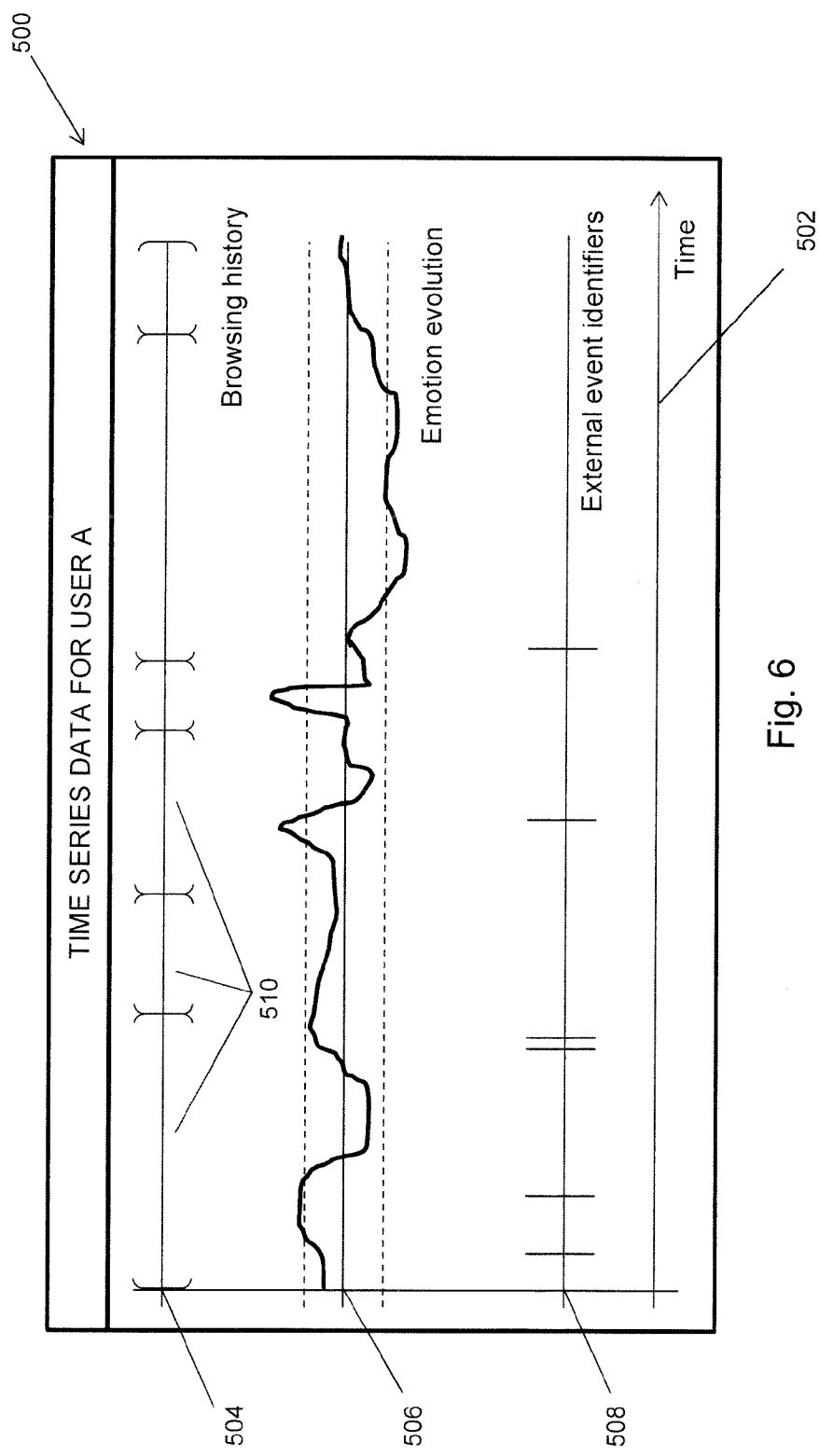
FIG. 6 is schematic graph illustrating examples of time series data collected for a user in conjunction with external event identifiers for use in subsequent analysis in accordance with one embodiment of the present invention.

FIG. 6 illustrates schematically the information that can be collected for a user using methods in accordance with embodiments of the present invention. FIG. 6 presents a chart 500 that has a horizontal time axis 502 and three time-series data sets 504, 506, 508 spatially separated from each other along a vertical axis. The data sets 504, 506, 508 are for the purposes of illustration only and are not intended to limit the type of information that can be gathered.

A first data set 504 corresponds to the browsing history of the user. On each webpage carrying the script for reporting behavioural data, there will be a period of time during which the user is interacting with that webpage. These periods of time are demarcated as separate sub-sessions 510 on the first data set 504. By recording the webpage (or the web property, if more appropriate) with which the user is interacting, embodiments of the invention enable the aggregation of behavioural data from a plurality of users with that webpage. This aggregated data can be a global aggregation (which can include all users over all time), or can be segmented, e.g., by demographic information, time period, etc., to yield further insight. Where a webpage does not carry the behavioural data collection script or where the user ceases to interact with the computing device (e.g., situations where the user is not in front of the camera or not interacting with the device) there will be a gap in the browsing history time series data 504, indicating a pause in the user's online presence.

A second data set 506 represents the time evolution of an emotion or other behavioural data parameter (e.g., attention or engagement). FIG. 6 is only a schematic illustration of one parameter. In practice, the information collected from the computing device can be analysed to obtain information about a plurality of emotional states and other behavioural data. However, importantly, the second data set 506 provides a quasi-continuous stream of information about the emotional state of a user during interaction with a plurality of webpages. This opens up a wide range of further analysis options that are not available in conventional emotion detection techniques where the data is captured only during a limited window of time during which a user to exposed to a specific piece of media. For example, the provision of a quasi-continuous stream of emotional state information enables the reaction of a user to a webpage to be placed in an emotional context of emotions exhibited prior and subsequent to exposure to a content item such as a web page, video, etc.

Furthermore, the possibilities of analysing behavioural data that is aggregated from a plurality of users is enhanced by the provision of a quasi-continuous stream of emotional state information for each user. Emotional state information can be aggregated based on information about the users, such as, demographic or location-based information. Alternatively or additionally, emotional state information can be aggregated based on the browsing history, such as grouping together users with similar browsing patterns or collecting the reaction of a segment of users to a particular webpage at a particular time.

A third data set 508 represents external events that can have an influence on the user, including the emotional state of the user. These external events can be user specific, e.g., related to the location or surrounds of the user including, but not limited to, weather, economic events, crime events, or they can be generic, e.g., relating to global phenomena such as time of day, season, etc. The external events can provide yet another analysis dimension for the collected behavioural data both at an individual level and also at an aggregated level.

FIGS. 1 through 6 are conceptual illustrations allowing for an explanation of the present invention. Those of skill in the art should understand that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A computer-implemented method of collecting computer user behavioral data during an interaction between a computer user and a computing device, wherein the computing device comprises a processor, a memory storing program code for execution by the processor, and a data recording component for capturing behavioral data of the computer user,
   wherein the data recording component comprises a webcam,
   wherein the program code comprises:
      a browser application having a browser-based application programme interface that is communicable with the webcam, and
      a behaviour collection application operable to collect the behavioral data from the data recording component during the interaction between the computer user and the computing device, and
   wherein the method comprises:
      running, by the browser application, a data collection activation script available to a webpage or a media player, wherein running the data collection activation script comprises:
         (i) locating a trackable element associated with the webpage or media player;
         (ii) upon locating a trackable element, calling the browser-based application programme interface to trigger activation of the webcam, and
         (iii) triggering initiation of the behavioral data collection application on the computing device using program code executing on the processor; and
      calling, by the behavioral data collection application, the browser-based application programme interface to access the data recording component in order to collect behavioral data recorded by the data recording component during the interaction between the computer user and the computing device.

2. A computer-implemented method according to claim 1, wherein the data collection activation script is contained in the source code of the web page or media player.

3. A computer-implemented method according to claim 1, wherein the browser-based application program interface is WebRTC.

4. A computer-implemented method according to claim 1, wherein running the data collection activation script comprises initiating an event log for recording events regarding the trackable element.

5. A computer-implemented method according to claim 4, wherein running the data collection activation script comprises:
subscribing to an application program interface associated with the trackable element, and
storing events occurring at the trackable elements in the event log.

6. A computer-implemented method according to claim 4, wherein running the data collection activation script comprises:
locating a plurality of trackable elements associated with the webpage or the media player, and
recording events occurring at the plurality of trackable elements in the event log.

7. A computer-implemented method according to claim 4, including synchronizing the event log with the behavioral data collected at the data recording component.

8. A computer-implemented method according to claim 1, wherein running the data collection activation script comprises:
performing a preliminary data capture capability check to ascertain if the computing device is capable of performing behavioral data collection.

9. A computer-implemented method according claim 1, wherein running the data collection activation script comprises:
detecting a user permission trigger event, and
upon detection of the user permission trigger event, triggering display of a user permission dialog on the computing device.

10. A computer-implemented method according to claim 1, wherein initiation of the behavioral data collection application comprises:
establishing communication between the computing device and a remote server; and
sending the collected behavioral data to the remote server for analysis.

11. A computer-implemented method according to claim 10 including:
sending analysis results from the remote server to the computing device; and
displaying the analysis results on the computing device.

12. A computer-implemented method according to claim 10, comprising part-processing the collected behavioral data before it is sent to the remote server for analysis.

13. A computer-implemented method according to claim 1, wherein the behavioral data comprises information indicative of the computer user's emotional state.

14. A computer-implemented method according to claim 13 including generating an emotional state evolution data log for the computer user.

15. A computer-implemented method according to claim 7, wherein synchronizing the event log with the behavioral data collected at the data recording component comprises overlaying an emotional state evolution data log for the computer user and the event log.

16. A computer-implemented method according to claim 1, wherein the method comprises deriving the behavioral data from a video feed from the webcam.

17. A computer-implemented method according to claim 1, wherein the data recording component further comprises a microphone, and wherein the method comprises deriving behavioral data from an audio feed from the microphone.

18. A computer-implemented method according to claim 1, wherein the data collection activation script is contained in the source code of a webpage, and the trackable element associated with the webpage is a media player embedded in the webpage.

19. A computer-implemented method according to claim 1, wherein running the data collection activation script is in response to an event selected from the group consisting of: loading the media player, detecting playback of predetermined media content on the media player, receiving a predetermined user input on the media player, and beginning playback of a predetermined item in a playlist on the media player.

20. A computer-implemented method according to claim 1, wherein the data recording component further comprises a hardware sensor configured to measure a physiological parameter of the computer user.

* * * * *